United States Patent
Lang et al.

(10) Patent No.: US 9,024,501 B2
(45) Date of Patent: May 5, 2015

(54) ROTOR APPARATUS AND METHODS OF IMPROVING MAGNETIZATION IN ELECTRIC MACHINES

(71) Applicant: Siemens Industry, Inc., Alpharetta, GA (US)

(72) Inventors: Nicholas G. Lang, Cincinnati, OH (US); Michael A. Graman, Cincinnati, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 340 days.

(21) Appl. No.: 13/647,490

(22) Filed: Oct. 9, 2012

(65) Prior Publication Data
US 2014/0097721 A1   Apr. 10, 2014

(51) Int. Cl.
| | |
|---|---|
| *H02K 17/00* | (2006.01) |
| *H02K 1/28* | (2006.01) |
| *H02K 7/00* | (2006.01) |
| *H02K 17/20* | (2006.01) |
| *H02K 1/32* | (2006.01) |

(52) U.S. Cl.
CPC ............ *H02K 1/28* (2013.01); *Y10T 29/49012* (2015.01); *H02K 1/32* (2013.01); *H02K 7/003* (2013.01); *H02K 17/20* (2013.01)

(58) Field of Classification Search
CPC .................................................. H02K 17/165
USPC ................. 310/211, 264, 216.122, 216.116, 310/216.121, 216.004, 216.007, 216.008
See application file for complete search history.

(56) References Cited

U.S. PATENT DOCUMENTS

| | | | | |
|---|---|---|---|---|
| 3,694,906 | A * | 10/1972 | Rank et al. ...................... | 29/598 |
| 5,185,918 | A * | 2/1993 | Shafer, Jr. ....................... | 29/598 |
| 5,467,521 | A * | 11/1995 | Nakamura et al. ............. | 29/598 |
| 5,952,764 | A * | 9/1999 | Nakamura et al. ..... | 310/216.004 |
| 6,177,750 | B1 * | 1/2001 | Tompkin ................ | 310/216.114 |
| 6,259,180 | B1 * | 7/2001 | Pop, Sr. ..................... | 310/261.1 |
| 6,534,891 | B2 * | 3/2003 | Kliman et al. ................ | 310/211 |
| 7,504,756 | B2 * | 3/2009 | Caprio et al. ................. | 310/211 |
| 7,777,375 | B2 | 8/2010 | Finley | |
| 7,919,895 | B2 * | 4/2011 | Verhoeven .................... | 310/211 |

* cited by examiner

*Primary Examiner* — Thanh Lam

(57) ABSTRACT

Induction motors may have a rotor that includes a shaft and a plurality of rotor laminations. The plurality of rotor laminations may have a central bore sized to receive the shaft, and the shaft may have a laminated portion that extends throughout the central bore. In other embodiments, the plurality of rotor laminations may have a very small or no central bore, and the shaft may include first and second end pieces respectively attached on opposite sides of the plurality of rotor laminations. In some embodiments, the first and second end shaft pieces may be attached to the rotor laminations with a through bolt that passes through the rotor laminations via a central bore sized no larger than needed to receive the through bolt, allowing each of the rotor laminations to have a larger laminated surface area. Methods of assembling a rotor are also provided, as are other aspects.

5 Claims, 5 Drawing Sheets

ROTOR APPARATUS AND METHODS OF IMPROVING MAGNETIZATION IN ELECTRIC MACHINES

FIELD

The invention relates generally to induction motors, and more particularly to construction of rotors and rotor shafts of induction motors.

BACKGROUND

Induction motors are a type of electric motor that may include a stator and a rotor. The stator is a stationary part of the motor that may be in the form of a hollow cylinder having a number of electrical windings located around an inside diameter of the hollow cylinder. The rotor is a part of the motor that rotates and may be in the form of a cylinder having a central bore. The rotor may be mounted on a shaft that is received through the central bore. The shaft may be connected to a load, which is to be driven by the motor. The rotor may include a number of a conductor bars (made, e.g., of copper or aluminum) extending through the cylinder and having their lengths oriented generally parallel to the shaft. The rotor fits inside the stator such that a small air gap separates the rotor from the stator. When an AC current is applied to the stator's windings, a rotating magnetic field is generated. The rotating magnetic field causes a current to flow in the conductor bars, which in turn magnetizes the rotor, generating a magnetic field around and through the rotor. Based on the magnetic properties of attraction and repulsion, the rotor's magnetic field follows the stator's rotating magnetic field. The rotating magnetic fields cause the rotor and shaft to rotate within the stator, which in turn, drives the connected load.

The ability of the rotor to magnetize and generate a magnetic field may be determined by the rotor's magnetic permeability. The higher the permeability, the more easily the rotor may magnetize and generate its own magnetic field, which drives the rotation of the rotor within the stator. Accordingly, a need exists to improve the magnetization of the rotor so as to improve motor performance.

SUMMARY

According to a first aspect, a rotor is provided that may have improved magnetization. The rotor includes a plurality of rotor laminations that has a central bore and a plurality of slots passing there through. The rotor also has a plurality of conductor bars received through the plurality of slots, and a shaft received through the central bore, wherein the shaft has a laminated portion that extends throughout the central bore.

According to another aspect, a rotor is provided that may have improved magnetization. This rotor includes a plurality of rotor laminations having a first end rotor lamination at a first end of the plurality of rotor laminations and a second end rotor lamination at a second opposite end of the plurality of rotor laminations. The plurality of rotor laminations has a plurality of slots passing there through, and the rotor also includes a plurality of conductor bars received through the plurality of slots. The rotor further includes a first shaft attached to the plurality of rotor laminations at the first end rotor lamination, and a second shaft attached to the plurality of rotor laminations at the second end rotor lamination.

According to a further aspect, a rotor includes a plurality of rotor laminations comprising a plurality of slots passing there through, a plurality of conductor bars received through the plurality of slots, and a rotor shaft attached to or received within the plurality of rotor laminations. The rotor comprises one or more laminated cross-sectional surface areas provided by (1) the plurality of rotor laminations having no central bore there within or having a central bore sized to receive only a through bolt there through, or (2) the plurality of rotor laminations and the rotor shaft received within a central bore of the plurality of rotor laminations, wherein the central bore is sized to receive the rotor shaft there through, and the rotor shaft has a laminated portion received within the central bore.

According to still another aspect, a method of assembling a rotor is provided. The method includes fabricating a plurality of rotor laminations having a central bore, receiving a shaft, laminating a portion of the shaft, and mounting the plurality of rotor laminations on the shaft such that the laminated portion is at least within the central bore.

According to yet another method aspect, a method of assembling a rotor is provided. This method includes fabricating a plurality of rotor laminations having a first end rotor lamination at a first end of the plurality of rotor laminations and a second end rotor lamination at a second opposite end of the plurality of rotor laminations. The method also includes receiving a first shaft and a second shaft, attaching the first shaft to the plurality of rotor laminations at the first end rotor lamination, and attaching the second shaft to the plurality of rotor laminations at the second end rotor lamination.

Still other aspects, features, and advantages of the invention may be readily apparent from the following detailed description wherein a number of exemplary embodiments and implementations are described and illustrated, including the best mode contemplated for carrying out the invention. The invention may also be capable of other and different embodiments, and its several details may be modified in various respects, all without departing from the scope of the invention. Accordingly, the drawings and descriptions are to be regarded as illustrative in nature, and not as restrictive. The drawings are not necessarily drawn to scale. The invention covers all modifications, equivalents, and alternatives falling within the scope of the invention.

DETAILED DESCRIPTION

Reference will now be made in detail to the example embodiments of this disclosure, which are illustrated in the accompanying drawings. Wherever possible, the same reference numbers will be used throughout the drawings to refer to the same or like parts.

The aforementioned problem of improving the magnetic permeability of a rotor may be overcome by one or more embodiments of the invention. In particular, most rotor shafts are made of solid steel or the like, which may, however, have lower magnetic permeability than the components of the rotor. Moreover, eddy currents may be induced within such solid steel materials, which may cause power losses. Such solid steel shafts, therefore, may impede the rotor's ability to magnetize and generate a magnetic field. In one aspect, a rotor is provided with a rotor shaft that may have a laminated portion (e.g., a laminated center portion). In one or more embodiments, the laminated center portion of the shaft is received and located within a central bore of the rotor's plurality of rotor laminations. The laminated center portion of the shaft may improve the shaft's magnetic permeability and, thus, the overall magnetic permeability of the rotor. In another aspect, a rotor shaft may include two end parts that are attached to respective axial ends of the rotor's plurality of rotor laminations. This allows the plurality of rotor laminations to have a larger laminated surface area, because a central bore for receiving a rotor shaft there through is not needed. The larger laminated surface area of the plurality of rotor laminations may improve the overall magnetic permeability of the rotor. In other aspects, methods of assembling a rotor that may have improved magnetic permeability are provided, as will be explained in greater detail below in connection with FIGS. 1-8.

Figure 1:
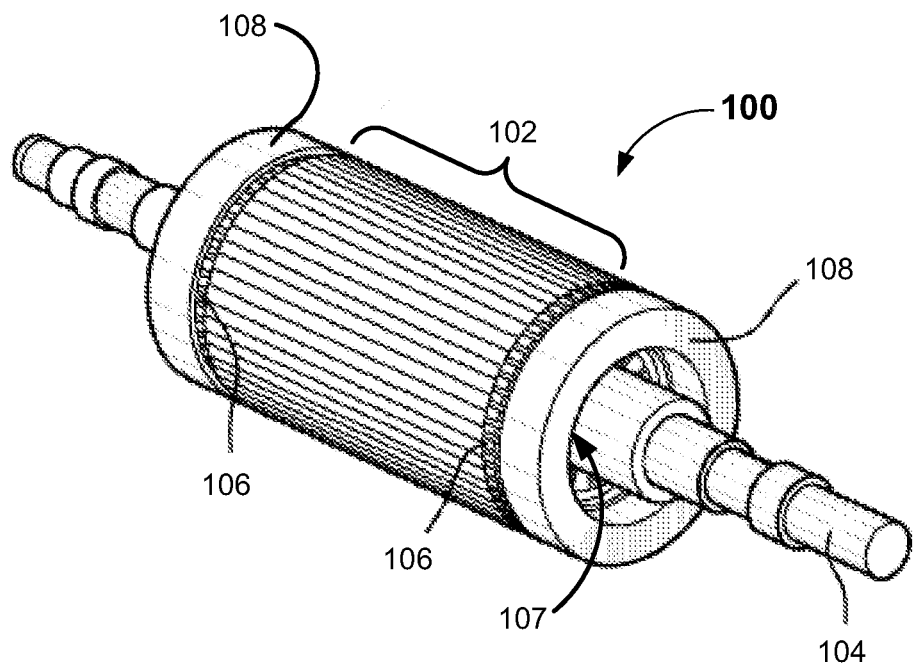
FIG. 1 illustrates a perspective view of a rotor according to embodiments.

FIG. 1 illustrates a rotor 100 that may be used in an induction motor in accordance with one or more embodiments. Note that rotor 100 may also be used in other suitable types of electric motors or machines. Rotor 100 may include a stacked plurality of rotor laminations 102, which may be a plurality of laminated steel plates or sheets (which are described in more detail below in connection with FIGS. 4, 5, and 7). Rotor laminations 102 may have a central bore 107 configured to receive a shaft 104. Rotor 100 may also include a plurality of rotor conductor bars 106 radially distributed around the periphery of the rotor laminations 102 and received through a respective plurality of peripherally-oriented slots in rotor laminations 102. Rotor 100 may further include a pair of end caps 108 mounted on opposing axial ends of rotor laminations 102, as shown. End caps 108 may be in the shape of rings and may be brazed to the rotor conductor bars 106. Rotor conductor bars 106 and/or end caps 108 may be made of, e.g., copper. Other suitable conductive material(s) may alternatively be used for rotor conductor bars 106 and/or end caps 108.

Figure 2:
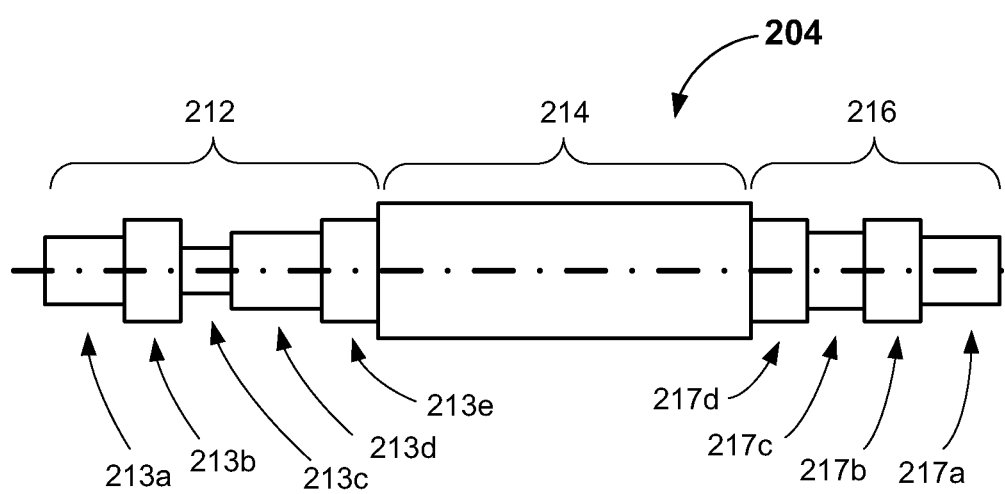
FIG. 2 illustrates an elevational view of a rotor shaft according to the prior art.

FIG. 2 illustrates an example configuration of a known rotor shaft. Rotor shaft 204 may have a generally cylindrical shape and may include a first end portion 212, a center portion 214, and a second end portion 216. Center portion 214 may be the portion of the shaft upon which a plurality of rotor laminations, such as, e.g., rotor laminations 102, may be mounted via a central bore in the rotor laminations. End portions 212 and 216 may have any suitable configuration that may include any suitable number of diameter changes, cutouts, journal connections, circumferential shape changes, and the like, such as, e.g., shaft changes 213a-e and/or shaft changes 217a-d, which may be used to facilitate attachment of the shaft 204 to one or more devices, bearings, structures, or loads (e.g., a fan or pump). End portions 212 and 216 may have the same or different configurations as each other and may have the same or different lengths as each other. In some embodiments, end portions 212 and/or 216 may have no diameter changes, cutouts, journal connections, or circumferential shape changes, but instead may have the same configuration (e.g., diameter) as center portion 214. In some embodiments, center portion 214 may not comprise the exact center of shaft 204. Shaft 204 may be made of a single piece of solid bar stock steel or the like, wherein end portions 212 and/or 216 may be turned in a lathe, e.g., to produce a desired configuration.

Figure 3:
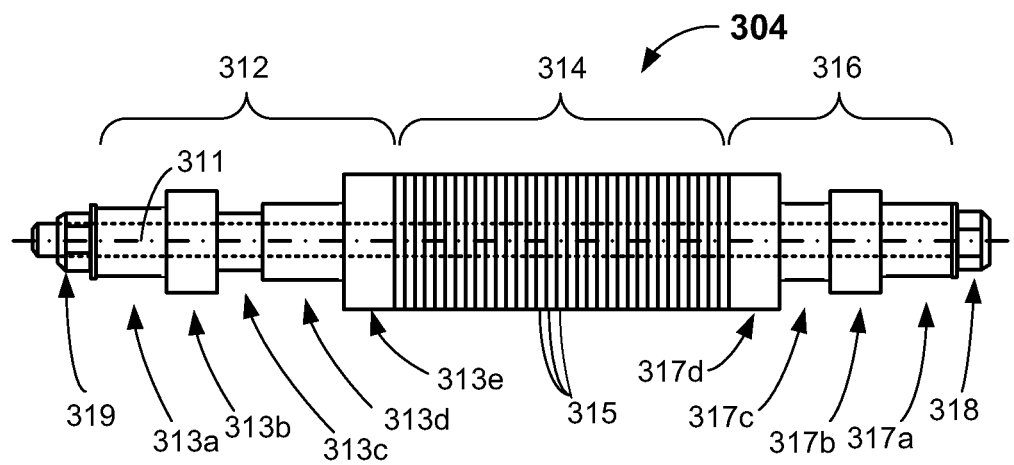
FIG. 3 illustrates an elevational view of a rotor shaft according to embodiments.

FIG. 3 illustrates a rotor shaft 304 in accordance with one or more embodiments. Rotor shaft 304 may be made of a combination of laminated discs and pieces of solid material (such as bar stock steel or the like, or any other suitable solid material). Rotor shaft 304 may include a first end portion 312, a center portion 314, and a second end portion 316, which may be separate components. Center portion 314 may have a laminated construction made up of laminated discs 315 (a few labeled) that may extend along an entire length of center portion 314, as measured along longitudinal axis 311. The laminated discs 315 may each have a central aperture therein. Each disc 315 may be washer shaped. The laminated discs 315 may each be manufactured from a ferrous material, such as, e.g., oriented or non-oriented electrical steel such as an iron-silicon alloy or the like (AISI M grade steels may be used including, e.g., M470-65 electrical steel, C5 core plate material, or the like). Center portion 314 may be laminated using any suitable method or process, such as, e.g., one or more processes associated with the American Iron and Steel Institute's C0 to C5. The discs 315 may be coated with any suitable insulation coating for electrical steel. Center portion 314 may be the portion of the shaft 304 upon which a plurality of rotor laminations, such as, e.g., rotor laminations 102, may be mounted via a central bore in those rotor laminations. In some embodiments, center portion 314 may not comprise the exact center of shaft 304, depending on the lengths of center portion 314 and first and second end portions 312 and 316.

First and second end portions 312 and 316 may each have any suitable configuration including any suitable number of diameter changes, cutouts, journal connections, circumferential shape changes, and the like, such as, e.g., shaft changes 313a-e and/or shaft changes 317a-d, which may be used to facilitate attachment of the shaft 304 to one or more devices, bearings, structures, or loads (e.g., a fan or pump). First and second end portions 312 and/or 316 may be turned in a lathe, e.g., to produce various desired configurations. First and second end portions 312 and 316 may have the same OF different configurations as each other and may have the same or different lengths as each other. In some embodiments, first end portion 312 and/or second end portion 316 may have no diameter changes, cutouts, journal connections, or circumferential shape changes, but instead may have the same configuration (e.g., diameter) as center portion 314. In some alternative embodiments, shaft 304 may not include one of first end portion 312 or second end portion 316. Each of the first end portion 312, second end portion 316, and center portion 314 includes a central bore therein (shown dotted). A through bolt 318 is received through the central bores and is used to align each of the portions 312, 314, and 316. A nut 319 may be provided on the other end and used to compress the entire rotor shaft assembly 304. The shaft portion of the through bolt may have a shoulder of relatively precise dimension to aid in precision alignment. In other embodiments, the bolt 318 may be integral with either of the first end portion 312 or second end portion 316.

Figure 4:
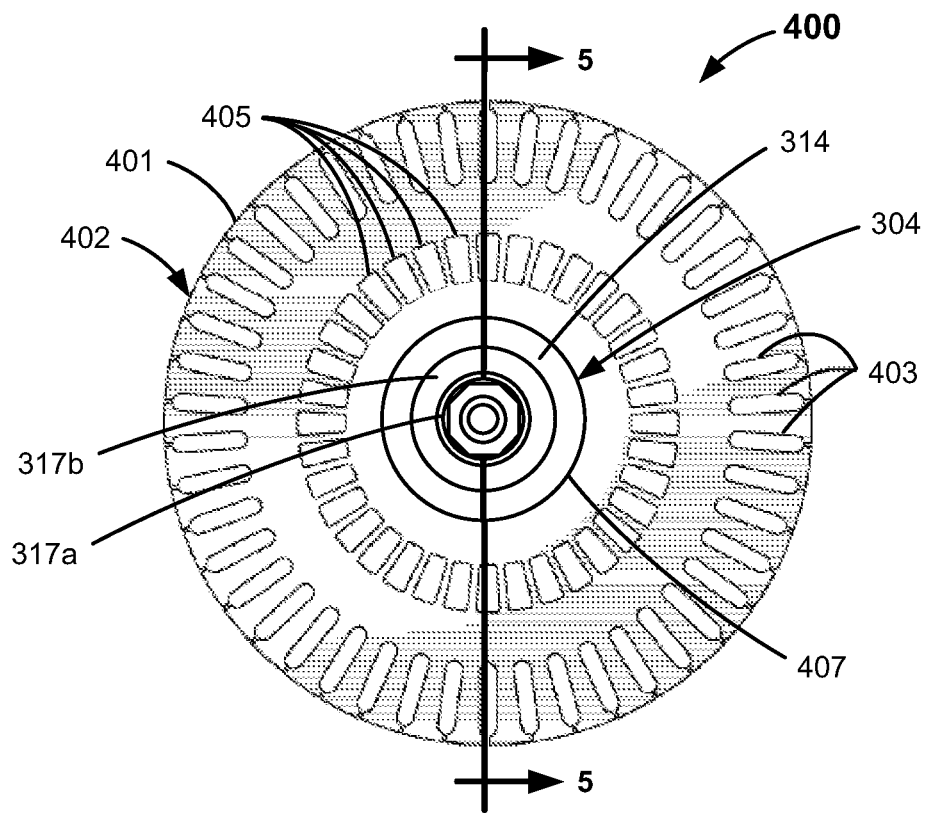
FIG. 4 illustrates an end plan view of a plurality of rotor laminations mounted on the shaft of FIG. 3 according to embodiments.
Figure 5:
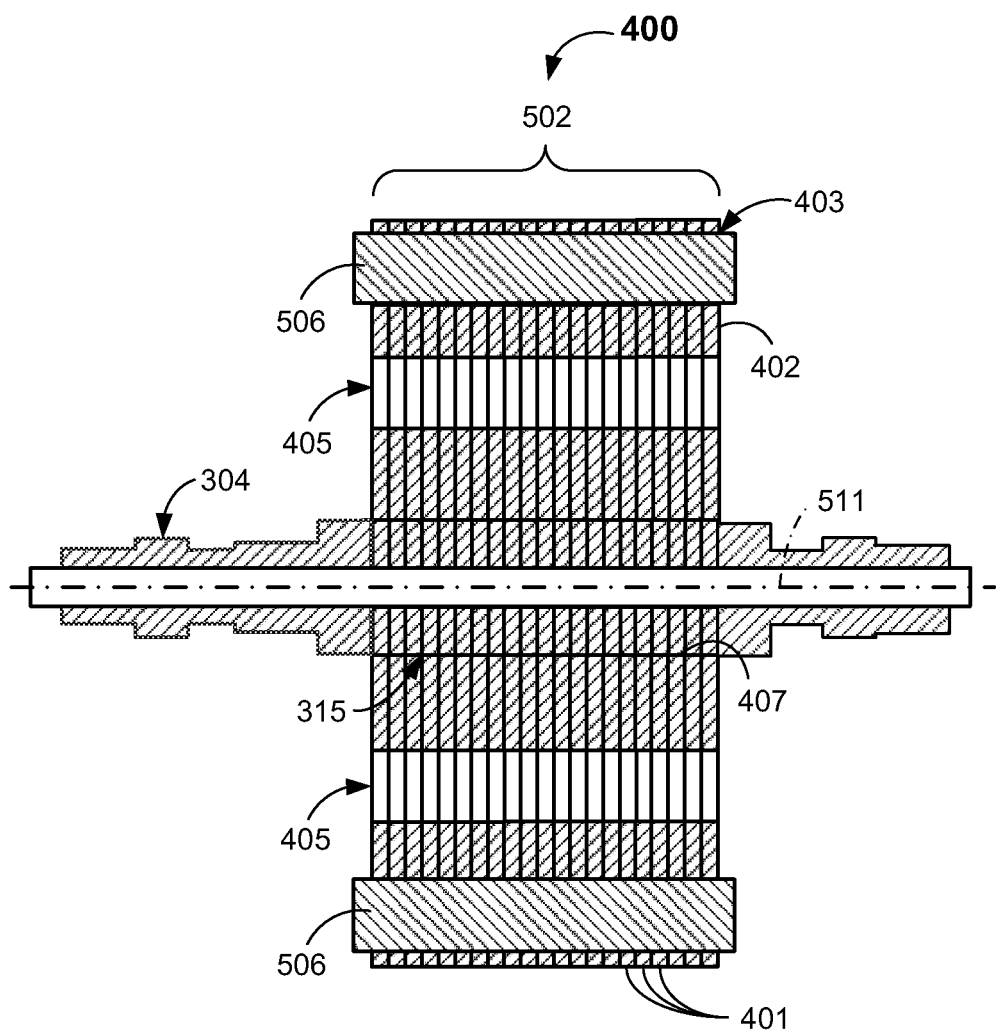
FIG. 5 illustrates a cross-sectional side view taken along section line 5-5 of FIG. 4 of the plurality of rotor laminations mounted on the shaft.

FIGS. 4 and 5 illustrate a rotor assembly 400 comprising a stacked plurality of rotor laminations 502. A representative end rotor lamination 402 is shown in FIG. 4 mounted on the rotor shaft 304, which includes a center section 315 having a laminated construction in accordance with one or more embodiments. The plurality of rotor laminations 502 may each be manufactured from a laminated disc-shaped plate, which may be a ferrous material, such as, e.g., steel (including, e.g., M470-65 electrical steel, C5 core plate material, or the like). Other suitable ferrous electrical steel materials may alternatively be used. The individual laminated disc-shaped plates of the plurality of rotor laminations 502 may be stamped, laser cut, water jet cut, or the like. Each of the individual laminated plates of the plurality of rotor laminations 502 may have the same construction and configuration as end rotor lamination 402. The plurality of rotor laminations 502 may each have a plurality of slots 403, a plurality of optional axial vents 405, and a central bore 407. Slots 403 may be arranged about an outer periphery 401 and may be arranged equidistantly from each other. Each slot 403 may be configured to receive there through a rotor conductor bar 506, which may be similar or identical to rotor conductor bar 106 of rotor 100. The plurality of rotor laminations 502 may alternatively have other suitable numbers, shapes, spacings, and/or arrangements of slots 403. The plurality of rotor laminations 502 may include radial vents in some embodiments.

The plurality of rotor laminations 502 may each have a plurality of axial vents 405 aligned and arranged in a ring around central bore 407 that may be openings that pass axially through the stacked plurality of rotor laminations 502. Axial vents 405 may provide a plurality of passageways for cooling air to be received through the rotor assembly 400. The plurality of rotor laminations 502 may have other suitable arrangements of axial vents 405. For example, the plurality of rotor laminations 502 may have two or more rings of axial vents 405 around central bore 407. Axial vents 405 may have any suitable shape (e.g., circular, trapezoidal, rectangular, elliptical, etc.) and, in some embodiments, one OF more axial vents 405 may have a shape and/or a cross-sectional area different than other axial vents 405. Some embodiments may have more or less axial vents 405 than those shown in FIGS. 4 and 5, including, in some embodiments, no axial vents 405.

Central bore 407 may be configured to receive there through a rotor shaft 304. The plurality of rotor laminations 502 may be mounted on the shaft 304 in any suitable manner, such as, e.g., by press fitting or being secured by one or more fasteners or keys. In some embodiments, the laminated center portion 315 of the shaft 304 may extend along an entire length of central bore 407, as measured along longitudinal axis 511, and may extend 360 degrees about the axis 511. Laminated portion 315 may increase the resistance of shaft 304 and, thus, reduce the induction of eddy currents therein and accordingly the power losses associated therewith. Laminated portion 315 may increase the overall magnetic permeability of the rotor, allowing more magnetic flux to flow through the rotor before the rotor becomes magnetically saturated which, ultimately, may result in an increase in power output.

In some embodiments, the magnetic flux output may allow the size of the rotor (and stator) to be reduced. In other embodiments, the increased magnetic flux may allow the size of the rotor (and stator) to be the same, but with increased power output. In other embodiments, the increased permeability attributable to the laminated construction 315 may allow the size and/or number of vents 405 to be increased to provide larger cooling passageways through the rotor assembly 400.

Figure 6:
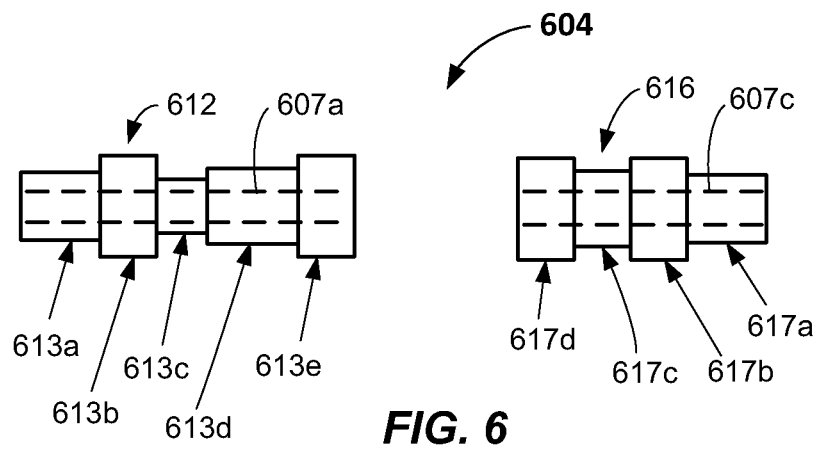
FIG. 6 illustrates an elevational view of another rotor shaft according to embodiments.

FIG. 6 illustrates another rotor shaft in accordance with one or more embodiments. Rotor shaft 604 may be made up of two separate pieces, a first end piece 612 and a second end piece 616, each of which may have a generally cylindrical shape. First end piece 612 and second end piece 616 may each have any suitable configuration including any suitable number of diameter changes, cutouts, journal connections, circumferential shape changes, and the like, such as, e.g., shaft changes 613a-e and/or shaft changes 617a-d, which may be used to facilitate attachment of shaft 604 to one or more devices, bearings, structures, or loads (e.g., a fan or pump). First end piece 612 and/or second end piece 616 may be turned in a lathe, e.g., to produce various desired configurations. First end piece 612 and second end piece 616 may have the same or different configurations as each other and may have the same or different lengths and/or diameters as each other. In some embodiments, first end piece 612 and/or second end piece 616 may have no diameter changes, cutouts, journal connections, or circumferential shape changes. In some alternative embodiments, one of first end piece 612 or second end piece 616 may be omitted. First and second end pieces 612 and 616 may each be made of a single piece of solid bar stock steel or the like, or of any other suitable material, and each may be made of the same or a different material as each other. In some embodiments, first end piece 612 and/or second end piece 616 may comprise two or more separate pieces that may be attached together as described herein.

Figure 7:
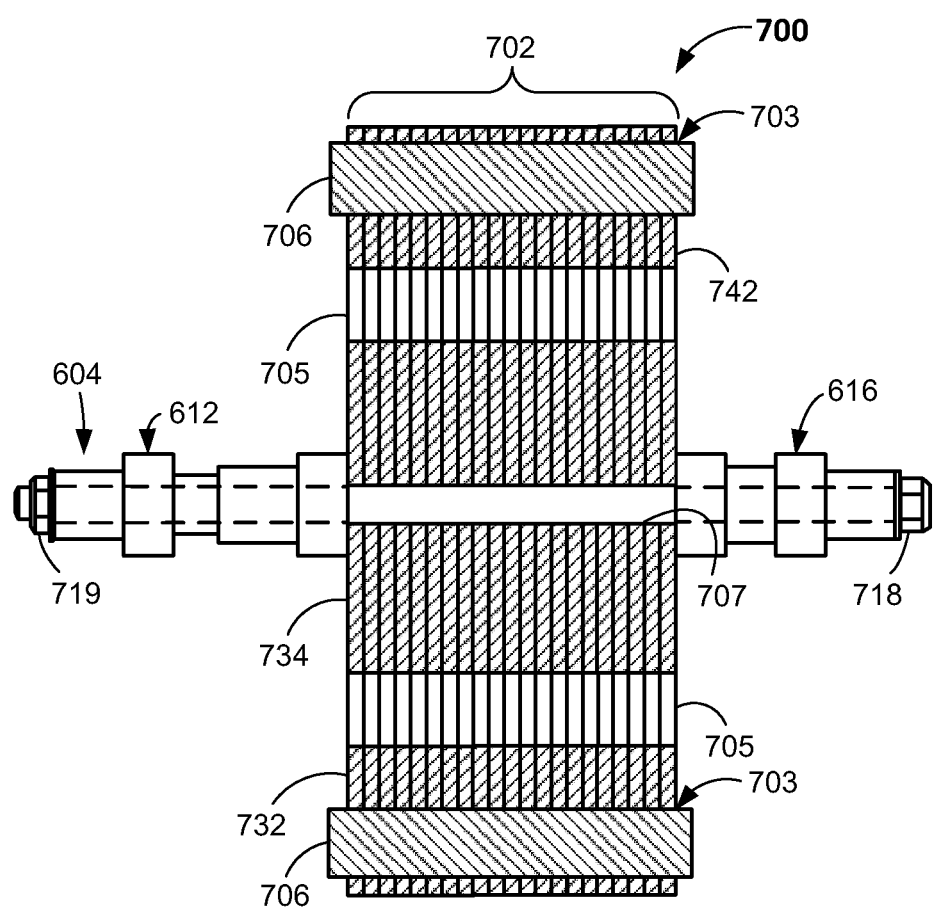
FIG. 7 illustrates a cross-sectional side view of a plurality of rotor laminations attached to the rotor shaft of FIG. 6.

FIG. 7 illustrates a rotor assembly 700 comprising the stacked plurality of rotor laminations 702 attached to rotor shaft 604 in accordance with one or more embodiments. The plurality of rotor laminations 702 has a first end rotor lamination 732 at a first end of the plurality of rotor laminations 702 and a second end rotor lamination 742 at a second opposite end of the plurality of rotor laminations 702. The plurality of rotor laminations 702 may each be manufactured from a laminated disc-shaped plate, which may be a ferrous material, such as, e.g., steel (including, e.g., M470-65 electrical steel, C5 core plate material, or the like). Other suitable ferrous electrical materials may alternatively be used. The individual laminated disc-shaped plates may be stamped, laser cut, water jet cut, or the like. The plurality of rotor laminations 702 may each have a plurality of slots 703, a plurality of axial vents 705, and a central bore 707. Slots 703 may be arranged about an outer periphery the rotor lamination and may be arranged equidistantly from each other, similarly or identically as slots 403 of rotor laminations 502. Each slot 703 may be configured to receive there through a rotor conductor bar 706. The plurality of rotor laminations 702 may alternatively have other suitable numbers, shapes, spacings, and/or arrangements of slots 703.

The plurality of rotor laminations 702 may each have a plurality of optional axial vents 705, similar or identical to axial vents 405 of rotor laminations 502, aligned and arranged in a ring around central bore 707 that may be openings that pass axially through the stacked plurality of rotor laminations. Axial vents 705 may provide a plurality of passageways for cooling air to be received through the rotor. The plurality of rotor laminations 702 may have other suitable arrangements of axial vents 705. For example, the plurality of rotor laminations 702 may have two or more rings of axial vents 705 around central bore 707. Axial vents 705 may have any suitable shape (e.g., circular, trapezoidal, rectangular, elliptical, etc.) and, in some embodiments, one or more axial vents 705 may have a shape and/or a cross-sectional area different than other axial vents 705. Some embodiments may have more or less axial vents 705 than those shown in FIG. 7, including, in some embodiments, no axial vents 705.

First end piece 612 may be attached to first end rotor lamination 732, and second end piece 616 may be attached to second end rotor lamination 742. Note that first and second end pieces 612 and 616 may be attached vice versa to the plurality of rotor laminations 702. First and second end pieces 612 and 616 may be respectively attached to the opposite sides of the plurality of rotor laminations 702 using any suitable joining or bonding technology or technique, such as, e.g., any suitable adhesive, type of welding (e.g., laser, diffusion, etc.), and/or mechanical arrangement (using, e.g., screws, anchors, etc.) capable of maintaining the attachment of the two shaft end pieces such that shaft 604 is able to transmit a requisite torque and/or provide a lateral, bending, and/or torsional stiffness as required by the rotor and/or induction motor. Depending on the manner in which first and second end pieces 612 and 616 are attached, one or more of the plurality of rotor laminations 702 may not have a central bore 707, wherein each of the plurality of rotor laminations 702 may then be attached to each other using any suitable joining or bonding technology or technique.

In some embodiments, first end piece 612 may have a shaft bore 607a, and second end piece 616 may have a shaft bore 607c (FIG. 6). First and second end pieces 612 and 616 may be attached to the plurality of rotor laminations 702 by inserting a through bolt 718 (which may be similar or identical to through bolt 318) through shaft bore 607a, central bore 707, and shaft bore 607c. A nut 719 may then be securely tightened onto through bolt 718 to compress the entire rotor assembly 700. The shaft portion of the through bolt 718 may have a shoulder of relatively precise dimension to aid in precision alignment. In some embodiments, central bore 707 may be sized no larger than a through bolt to be received there through.

Because the plurality of rotor laminations 702 may not have a central bore 707, or a central bore 707 sized no larger than a through bolt to be received there through, the laminated surface area of each of the rotor laminations 702, such as, e.g., laminated surface area 734 of first end rotor lamination 732, may be larger than the laminated surface area of rotor laminations having a central bore sized to receive a rotor shaft there through, such as, e.g., rotor laminations 502 having central bore 407. The larger laminated surface area may increase the overall magnetic permeability of the rotor, allowing more magnetic flux to flow through the rotor before the rotor becomes magnetically saturated which, ultimately, may result in greater power output. In some embodiments, the magnetic flux output may allow the size of the rotor (and stator) to be reduced. In other embodiments, the increased magnetic flux may allow the size of the rotor (and stator) to be the same, but with more power output. In other embodiments, the increased permeability attributable to the larger laminated surface area of the rotor laminations may allow the size and/or number of vents 705 to be increased to provide larger cooling passageways through the rotor assembly 700.

Figure 8:
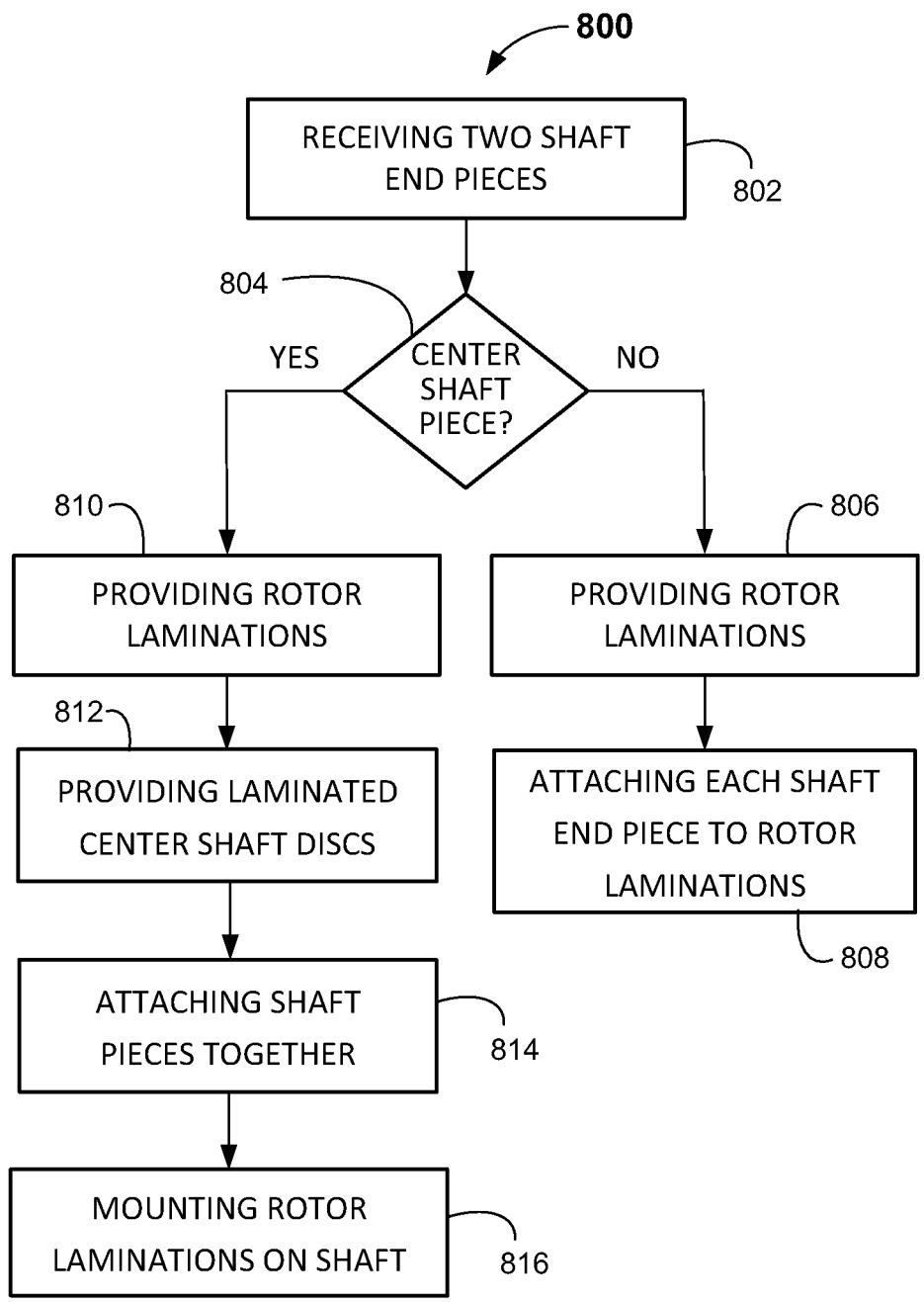
FIG. 8 illustrates a method of assembling a rotor according to embodiments.

FIG. 8 illustrates a method 800 of assembling a rotor in accordance with one or more embodiments. Method 800 may include at process block 802 receiving two shaft end pieces. The two separate shaft end pieces may each have a generally cylindrical shape and may each have any suitable configuration including any suitable number of diameter changes, cutouts, journal connections, circumferential shape changes, and the like, such as, e.g., shaft changes 613a-e and/or shaft changes 617a-d of shaft 604, which may be used to facilitate attachment of a two-piece shaft to one or more devices, bearings, structures, or loads (e.g., a fan or pump). Either or both of the two end pieces may be turned in a lathe, e.g., to produce various desired configurations. The two end pieces may have the same or different configurations as each other and may have the same or different lengths and/or diameters as each other. In some embodiments, either or both of the two end pieces may have no diameter changes, cutouts, journal connections, or circumferential shape changes. In some alternative embodiments, one of the two end pieces may be omitted. The two end pieces may each be made of a single piece of solid bar stock steel or the like, or of any other suitable material, and each may be made of the same or a different material as each other. In some embodiments, either or both of the two end pieces may comprise two or more separate pieces attached together as described herein. The two shaft end pieces may be similar or identical to, e.g., first end portion 312 and second end portion 316 of shaft 304 and/or first end piece 612 and second end piece 616 of shaft 604.

At decision block 804, if a center shaft piece is not required, method 800 may proceed to block 806.

At block 806, method 800 may include providing rotor laminations. Rotor laminations may each be manufactured from a laminated disc-shaped plate, which may be a ferrous material, such as, e.g., steel (including, e.g., M470-65 electrical steel, C5 core plate material, or the like). Other suitable ferrous electrical materials may alternatively be used. The individual laminated disc-shaped plates may be stamped, laser cut, water jet cut, or the like, and each rotor lamination may have a plurality of conductor bar slots, an optional plurality of axial vents and, in some embodiments, a central bore sized to receive only a through bolt there through, such as, e.g., slots 703, axial vents 705, and central bore 707 of rotor laminations 702, respectively. In some embodiments, the rotor laminations may not have a central bore. Each rotor lamination may be laminated using any suitable method or process, such as, e.g., one or more processes associated with the American Iron and Steel Institute's C0 to C5 classifications of insulation coatings for electrical steel.

At block 808, the two shaft end pieces may be attached to the rotor laminations. One end piece may be attached to one end of the plurality of rotor laminations (such as, e.g., to first end rotor lamination 732 of rotor laminations 702) and the other end piece may be attached to the opposite end of the plurality of rotor laminations (such as, e.g., to second end rotor lamination 742 of rotor laminations 702). Any suitable joining or bonding technology or technique may be used, such as, e.g., any suitable adhesive, type of welding (e.g., laser, diffusion, etc.), and/or mechanical arrangement (using, e.g., screws, anchors, etc.) capable of maintaining the attachment of the two shaft end pieces such that the two-piece shaft is able to transmit a requisite torque and/or provide a lateral and/or torsional stiffness as required by the rotor and/or induction motor. Depending on the manner in which the two end pieces are attached, one or more of the plurality of rotor laminations may not have a central bore, wherein each of the plurality of rotor laminations may then be attached to each other using any suitable joining or bonding technology or technique. In some embodiments, the two end pieces may be attached to the plurality of rotor laminations by inserting a through bolt (such as, e.g., through bolt 718) through (1) a shaft bore in one of the two end pieces, (2) a central bore in the plurality of rotor laminations, and (3) a shaft bore in the other one of the two end pieces. A nut (such as, e.g., nut 719) may then be used to securely tighten the two end pieces to the plurality of rotor laminations. The resulting rotor assembly may be similar of identical to rotor assembly 700, wherein through bolt 718 is used to attach first and second end pieces 612 and 616 via shaft bores 607a and 607c, respectively, to rotor laminations 702 via central bore 707.

Returning to decision block 804, if a center shaft piece is required, method 800 may proceed to block 810.

At block 810, method 800 may include providing a plurality of rotor laminations. Each rotor lamination may be manufactured from a laminated disc-shaped plate, which may be a ferrous material, such as, e.g., steel (including, e.g., M470-65 electrical steel, C5 core plate material, or the like). Other suitable ferrous materials may alternatively be used. The individual laminated disc-shaped plates may be stamped, laser cut, water jet cut, or the like, and each rotor lamination may have a plurality of conductor bar slots, an optional plurality of axial vents, and a central bore sized to receive a rotor shaft there through, such as, e.g., slots 403, axial vents 405, and central bore 407 of rotor laminations 502, respectively. Each rotor lamination may be laminated using any suitable method or process, such as, e.g., one or more processes associated with the American Iron and Steel Institute's C0 to C5 classifications of insulation coatings for electrical steel.

At block 812, method 800 may include providing a laminated center shaft portion, such as, e.g., center portion 314 of shaft 304. The center shaft portion may be fabricated with a plurality of laminated discs, such as, e.g., discs 315 of shaft 304. The laminated discs may each have a central aperture therein and may be washer shaped. The laminated discs may each be manufactured from a ferrous material, such as, e.g., oriented or non-oriented electrical steel such as an iron-silicon alloy or the like (AISI M grade steels may be used including, e.g., M470-65 electrical steel, C5 core plate material, or the like). The discs may be laminated using any suitable method or process, such as, e.g., one or more processes associated with the American Iron and Steel Institute's C0 to C5 classifications. The discs may be coated with any suitable insulation coating for electrical steel. The center portion may be the portion of the rotor shaft upon which a plurality of rotor laminations, such as, e.g., rotor laminations 502, may be mounted via a central bore in the rotor laminations.

At block 814, the plurality of laminated discs making up the center portion and the two end pieces may be attached to each other. The plurality of laminated discs may first be attached together to form a single center piece and then the two end pieces and the single center piece may be attached to each other, or the two end pieces and the plurality of laminated discs may all together be attached to each other, using any suitable joining or bonding technology or technique capable of maintaining the attachment of the three portions such that the multi-piece shaft is able to transmit a requisite torque and/or provide a lateral and/or torsional stiffness as required by the rotor and/or induction motor. For example, any suitable adhesive, type of welding (e.g., laser, diffusion, etc.), and/or mechanical arrangement (using, e.g., screws, anchors, etc.), or combinations thereof, may be used. In some embodiments, the two end pieces and the center portion may each have a shaft bore such that the three shaft portions may be attached to each other via a through bolt, such as, e.g., through bolt 318, inserted through the shaft bores, wherein a nut, such as, e.g., nut 319, is used to tightened and compress the entire rotor shaft assembly together, such as, e.g., rotor shaft 304.

At block 816, the plurality of rotor laminations may be mounted on the rotor shaft in any suitable manner, such as, e.g., by press fitting or being secured by one or more fasteners or keys. The laminated center portion of the shaft may be the portion of the shaft located within the central bore of the rotor laminations mounted thereon. The resulting rotor assembly may be similar or identical to, e.g., rotor assembly 400.

It should be understood that the above process blocks of method 800 may be executed or performed in an order or sequence not limited to the order and sequence shown and described. Also, some of the above blocks may be executed or performed substantially simultaneously or in parallel where appropriate or desired. For example, in some embodiments, blocks 810 and 812 may be performed in reverse order or in parallel or substantially simultaneously.

Note that persons skilled in the art should readily appreciate that the invention described herein is susceptible of broad utility and application. Many embodiments and adaptations of the invention other than those described herein, as well as many variations, modifications, and equivalent arrangements, will be apparent from, or reasonably suggested by, the invention and the foregoing description thereof, without departing from the substance or scope of the invention. For example, although described in connection with rotors of an induction motor, the invention may be applicable to other suitable types of rotors and/or electric motors or machines. Accordingly, while the invention has been described herein in detail in relation to specific embodiments, it is to be understood that this disclosure is only illustrative and presents examples of the invention and is made merely for purposes of providing a full and enabling disclosure of the invention. This disclosure is not intended to limit the invention to the particular devices, systems or methods disclosed, but, to the contrary, the intention is to cover all modifications, equivalents, and alternatives falling within the scope of the invention.

What is claimed is:

1. A rotor, comprising:
    a plurality of rotor laminations comprising:
        a plurality of slots passing there through; and
        a central bore;
    a plurality of conductor bars received through the plurality of slots; and
    a shaft received through the central bore, the shaft comprising a laminated portion extending throughout the central bore.

2. The rotor of claim 1 wherein the shaft further comprises first and second unlaminated portions, the first unlaminated portion located at a first axial end of the laminated portion and the second unlaminated portion located at a second opposite axial end of the laminated portion.

3. The rotor of claim 1 wherein the laminated portion of the shaft comprises a plurality of laminated discs.

4. The rotor of claim 1 wherein the shaft comprises a first piece, a second piece, and a third piece attached axially together such that the first piece is attached to the second piece at a first axial end of the second piece and the third piece is attached to the second piece at a second opposite axial end of the second piece, wherein the second piece comprises the laminated portion.

5. The rotor of claim 1 wherein the rotor further comprises a pair of end caps, each end cap mounted at an axial end of the plurality of rotor laminations.

* * * * *